United States Patent
Kohle (10) Patent No.: US 8,126,222 B2
(45) Date of Patent: Feb. 28, 2012

(54) METHOD, DIGITAL STORAGE MEDIUM, AND IMAGE DATA PROCESSING AND VISUALIZATION SYSTEMS FOR COLORING OF VOXELS, WHICH ARE SELECTED VIA A MAXIMUM INTENSITY PROJECTION-TYPE TECHNIQUE USING AT LEAST ONE COLOR COORDINATE OF A COLOR CONTINUUM AS INTENSITY

(75) Inventor: Sven Kohle, Bremen (DE)

(73) Assignee: Fraunhofer-Gesellschaft zur Forderung der angewandten Forschung eingetragener Verein, Munich (DE)

( * ) Notice: Subject to any disclaimer, the term of this patent is extended or adjusted under 35 U.S.C. 154(b) by 1189 days.

(21) Appl. No.: 10/356,347

(22) Filed: Jan. 31, 2003

(65) Prior Publication Data
US 2004/0096088 A1 May 20, 2004

(30) Foreign Application Priority Data
Nov. 15, 2002 (EP) .................................. 02025473

(51) Int. Cl.
*G06K 9/36* (2006.01)
(52) U.S. Cl. ........ 382/128; 345/587; 600/410; 600/411; 600/425; 600/427; 600/437
(58) Field of Classification Search ................... 345/587; 382/128; 600/407
See application file for complete search history.

(56) References Cited

U.S. PATENT DOCUMENTS

| | | | |
|---|---|---|---|
| 5,743,266 A * | 4/1998 | Levene et al. | 600/458 |
| 6,115,485 A | 9/2000 | Dumoulin et al. | |
| 6,177,923 B1 * | 1/2001 | Arenson et al. | 345/589 |
| 6,553,327 B2 * | 4/2003 | Degani | 702/100 |
| 6,748,347 B1 * | 6/2004 | Dalton | 703/5 |
| 2002/0060679 A1 * | 5/2002 | Malzbender et al. | 345/423 |
| 2002/0133070 A1 * | 9/2002 | Huang et al. | 600/420 |
| 2003/0028101 A1 * | 2/2003 | Weisskoff et al. | 600/431 |
| 2004/0242994 A1 * | 12/2004 | Brady et al. | 600/420 |

FOREIGN PATENT DOCUMENTS
WO 9726507 A1 7/1997

OTHER PUBLICATIONS

"Visualization of Medicine" by: Bernhard Preim and Dirk Bartz; pp. 191-193, San Francisco, 2007.
Office Action for corresponding application No. EP 02025473.6-1522, dated Jul. 21, 2008.
"Maximum intensity projection at warp speed" by: Lucas Mroz, Andreas Koing and Eduard Groller, Data Visualization Computer and Graphics 24 343-352 (2000).

* cited by examiner

*Primary Examiner* — Parikha Mehta
(74) *Attorney, Agent, or Firm* — Lowe Graham Jones PLLC (57) ABSTRACT

A method for coloring of voxel and image data processing and visualization system That consists of providing an intensity function for each one of the voxels, and mapping of each one of the intensity functions to at least first and second color coordinates of a color continuum to provide a color for each one of the voxels.

9 Claims, 5 Drawing Sheets

METHOD, DIGITAL STORAGE MEDIUM, AND IMAGE DATA PROCESSING AND VISUALIZATION SYSTEMS FOR COLORING OF VOXELS, WHICH ARE SELECTED VIA A MAXIMUM INTENSITY PROJECTION-TYPE TECHNIQUE USING AT LEAST ONE COLOR COORDINATE OF A COLOR CONTINUUM AS INTENSITY

BACKGROUND OF THE INVENTION

1. Field of the Invention

The present invention relates to the field of image data processing, and more particularly without limitation, to the field of processing and visualizing of four dimensional data, such as time variant three dimensional image data.

2. Prior Art

Dynamic imaging of volume data is used in medicine to detect abnormalities in tissue perfusion, for example in the brain to diagnose an acute stroke or in the female breast for tumour detection and classification (cf. E. L. Barbier, L. Lamalle, M. Decorps (2001). "Methodology of Brain Perfusion Imaging", *Journal of Magnetic Resonance Imaging* 13: 496-520; H. Degani, V. Gusis, D. Weinstein, S. Fields, S. Strano (1997). "Mapping pathophysiological features of breast tumors by MRI at high spatial resolution", *nature medicine* 3:7, pp. 780-782; "Improved diagnostic accuracy in dynamic contrast enhanced MRI of the breast combined quantative and qualitative analysis" P-F Liu MD, J F Debatin MD, R F Caduff MD, G Kacl MD, E Garzoli MD and G P Krestin MD.)

The significance of dynamic information for diagnosis of tumours has been shown in the prior art. It is as such known that both morphological information based on high spatial resolution images in combination with dynamic temporal information of contrast agents intensity curves to measure tissue kinetics enhances tumour characterisation (cf. C. K. Kuhl, H. H. Schild (2000). "Dynamic Image Interpretation of MRI of the breast", *Journal of Magnetic Resonance Imaging* 12, pp. 965-974.)

WO97/26507 shows an image processing apparatus for contrast enhanced MRI data in order to facilitate specific diagnosis of cancer. The wash-out slope after injection of a contrast agent is encoded in three different colors red, green and blue. One of the drawbacks of this method is that a lot of the information content of the time variant image data is lost due to this color-encoding scheme. Another major drawback is that this method can only be employed for coloring of time variant two dimensional image data but not for coloring and displaying time variant three dimensional image data. It is therefore an object of the present invention to provide for an improved coloring method and image data processing system as well as a corresponding computer program product.

SUMMARY OF THE INVENTION

The present invention enables to generate an intuitive display of four dimensional data, such as for three dimensional time variant image data. This is accomplished by providing an intensity function of time for each of the voxels (volume pixels) of the three dimensional image. Each of the intensity functions is mapped to a color continuum to color-encode the characteristic of the intensity function. This way a meaningful three dimensional image is generated which shows the characteristics of the intensity functions in an intuitive way.

In accordance with a preferred embodiment of the invention magnetic dynamic 3D ultrasound, resonance imaging (MRI) or computer tomography (CT) is used for acquiring a sequence of three dimensional medical images after administration of a contrast agent. This way time variant information is obtained for a specific region or organ of a patient's body.

In these examinations typically a bolus of a contrast agent is injected and its distribution is followed by a repeated acquisition of subsequent images covering the volume of interest. The contrast agent provides signal changes either in CT or MRI and works as a tracer of the blood. Depending on the actual physiological process, either the short-term distribution (<1 min) of blood flow (perfusion) or the long-term (>1 min) diffusion process of the tracer particles through the membranes of the micro-vessels (tissue kinetics) are encoded in the varying signal of the image voxels. The extracted time-intensity curves for each voxel are typically converted into relative concentration-time curves. These are called enhancement curves (intensity functions).

However, it is to be noted that the administration of a contrast agent is not always required. For example, blood oxygen level-dependent (BOLD) magnetic resonance imaging does not require a contrast agent. BOLD enables to perform dynamic perfusion measurements without a contrast agent.

In accordance with a preferred embodiment of the invention, tumour diagnostic is performed by determining the gradient of the intensity function during wash-in of the contrast agent and by mapping the gradient onto a first color coordinate of the color continuum. To obtain a second color coordinate of the color continuum, the gradient of the intensity function during wash-out is determined and mapped.

In accordance with a further preferred embodiment of the invention integrals below the intensity functions are determined for stroke diagnosis. For example the first pass of the contrast agent is sub-divided into three time intervals. For each of the time intervals the integral below the intensity function is determined. The three integrals are mapped onto corresponding three color coordinates of the color continuum.

In accordance with a further preferred embodiment of the invention a maximum intensity projection (MIP) technique is used for display of the colored three dimensional image data on a two dimensional display. By means of MIP voxels of the colored three dimensional image data are selected for display. Preferably local MIP which is also known as closest vessel projection (CVP) is used. In this instance the voxel on a projection ray having the first local intensity maximum above a certain threshold is selected. Thus, a voxel with lower intensity in the foreground can occlude a more intense voxel in the background.

In accordance with a further preferred embodiment of the invention selected voxels which have an intensity below the threshold are displayed in grey-scale. This way intensity functions having a relatively low maximum intensity are filtered out as far as the color-encoding is concerned for the purpose of noise reduction. Still the complete three dimensional image information concerning the contours of the observed region is preserved.

In accordance with a further preferred embodiment of the invention the intensity function is not a function of time but a function of another parameter. For example, in magnetic resonance spectroscopy (MRS) a frequency spectrum is determined for each voxel. This frequency spectrum of each voxel is used as an intensity function in accordance with the present invention. Applications include analysis of brain tumours and brain metabolism as well as pharmacokinetic studies.

It is to be noted that application of the present invention is not restricted to particular types of four-dimensional data but that the invention can be employed for visualisation of all volumetric data where each voxel within the volume has a parameter dependant intensity function. The parameter can be of a physical, biological or technical nature. For example, temperature and gas density distribution within a turbine can be simulated with varying concentrations of an additive. In this instance, the concentration of the additive is the fourth dimension of the three-dimensional data set.

BRIEF DESCRIPTION OF THE DRAWINGS

In the following preferred embodiments of the invention will be described in greater detail by making reference to the drawings in which.

DETAILED DESCRIPTION OF PREFERRED EMBODIMENTS

Figure 1:
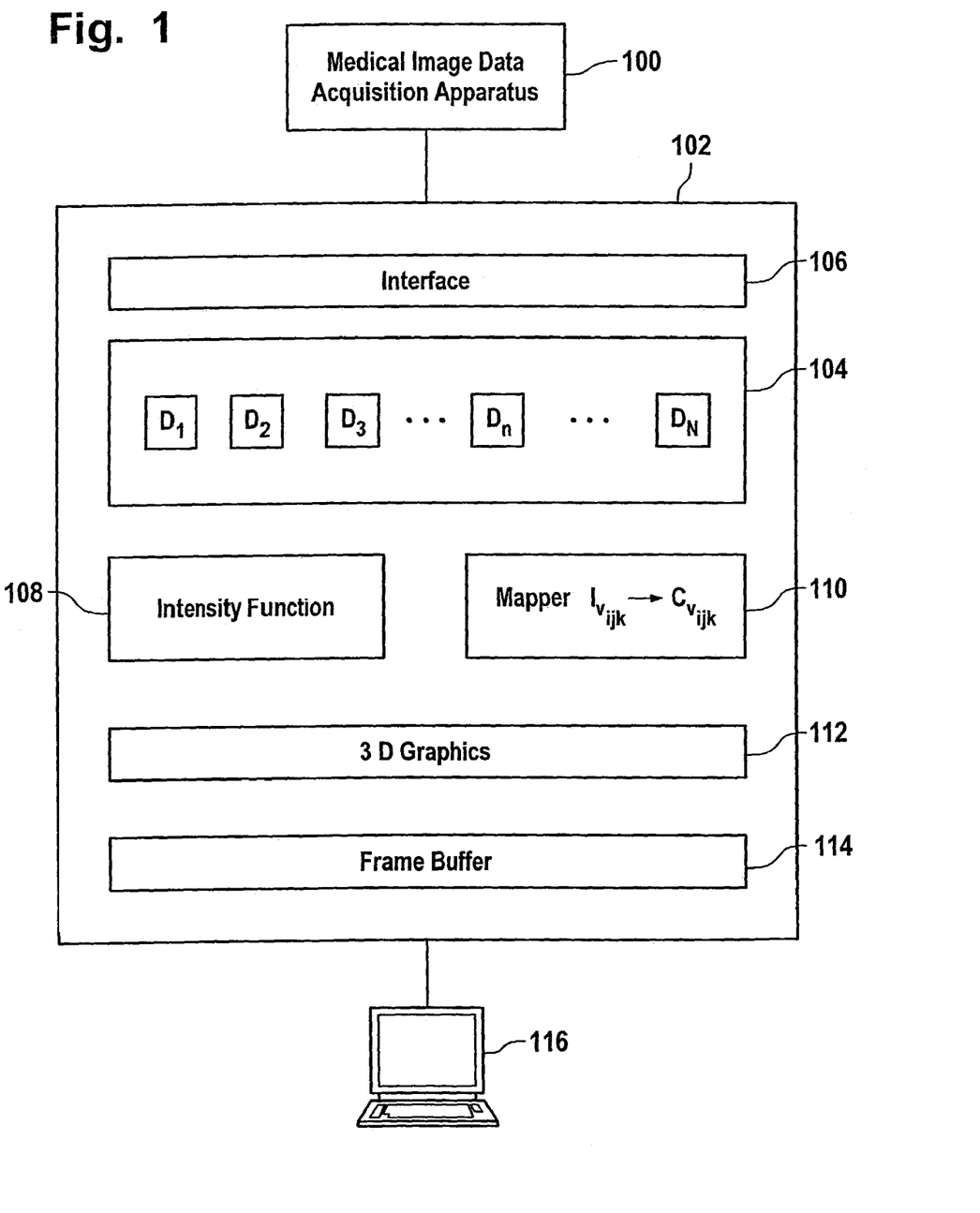
FIG. 1 is a block diagram of an embodiment of a medical imaging system of the invention.

FIG. 1 shows a medical imaging system having a medical image data acquisition apparatus 100, such as a computer tomograph (CT) or a magnetic resonance imaging (MRI) apparatus. Apparatus 100 enables the acquisition of three dimensional time-varying data of a specific region of a patient's body, such as to assess blood flow (perfusion) and tissue extraction (tissue kinetics) by tracing the distribution of contrast agents. With state-of-the-art CT or MRI imaging modalities the effects of blood perfusion can be measured in scales of millimeters and seconds and cover complete organs. Examples include brain MRI perfusion examinations with as many as 20 slices and 40 time points and breast MRI with 3D data sets of 80 slices and 6 time points.

Apparatus 100 is coupled to the image data processing system 102. The Image data processing system 102 has memory 104 for storing a sequence of three dimensional image data $D_1, D_2, D_3, \ldots D_n, \ldots D_M$. The sequence of 3D image data $D_n$ is acquired by apparatus 100 and entered into memory 104 via interface 106 of image data processing system 102.

Further, apparatus 100 has a module 108 for determining the intensity functions of voxels contained in the 3D image data sets $D_1, D_2, D_3, \ldots D_n, \ldots D_M$ as a function of time. Further apparatus 100 has module 110 for mapping of the intensity functions provided by module 108 to a color continuum.

For example, the sets of three dimensional image data $D_1, D_2, D_3, \ldots D_n, \ldots D_M$ contain a three dimensional grid of voxels $v_{ijk}$. For each of the voxels $v_{ijk}$ an intensity function $I_{v_{ijk}}$ (t) of time is obtained from the sequence of the three dimensional image data sets $D_1, D_2, D_3, \ldots D_n, \ldots D_M$. Each of the intensity functions $I_{v_{ijk}}$ is mapped to a color C of a color continuum in order to encode the characteristic of the intensity function $I_{v_{ijk}}$. This way a color is provided for each of the voxels. $V_{igk}$.

This results in a three dimensional data set of voxels $v_{ijk}$ each of the voxels having a color $C_{c_{ijk}}$. The resulting color-coded three dimensional data set is processed by 3D graphics module 112 in order to provide two dimensional data for frame buffer 114 of display unit 116.

3D graphics module 112 implements a projection method in order to provide the two dimensional projection data based on the three dimensional grid of colored voxels. The projection is based on the colors of the voxels rather than on the voxel intensity values. This contrasts to prior art projection methods, such as MIP-type methods, which use the voxel intensities as a selection criterion. Such prior art projection methods can be used for the purpose of the invention by replacing greyscale intensity with color as a selection criterion. Preferably, one color coordinate, such as the V-coordinate of a HSV color space is used as a selection criterion instead of greyscale intensity values. 3D graphics module 112 can be implemented by software and/or by means of dedicated hardware support.

The selected voxels are displayed on display unit 116 with the encoded colors. By means of an appropriate, user interface an operator, such as a radiologist, can change the view angle or rotate the image.

It is to be noted that the present invention is not limited to MIP but that other volume rendering techniques can also be employed. Such techniques are as such known from the prior art for grey-scale images from:

Cline, H. E.; Dumoulin, C. L.; Hart, H. R., Jr.; Lorensen, W. E.; & Ludke S. (1987). "3D Reconstruction Of The Brain From Magnetic Resonance Images Using A Connectivity Algorithm", *Magnetic Resonance Imaging*, Vol. 5, pp 345-352, 1987, Rubin, D. Geoffrey; Dake, D. Michael; Napel, Sandy R. Brooke Jeffrey, Jr; McDonnell, H. Charles; Sommer, F. Graham; Wexler, Lewis; & Williams, M. David (1994) "Spiral CT of Renal Artery Stenosis: Comparison of Three-Dimensional Rendering Techniques", *Radiology*, 190, pp. 181-189, 1994, Halpern, J. Ethan; Wechsler, J. Richard; & DiCampli, Dennis (1995). "Threshold Selection for CT Angiography Shaded Surface Display of the Renal Arteries", *Journal of Digital Imaging, Vol.* 8, No3(August), 1995: pp 142-147.

Figure 2:
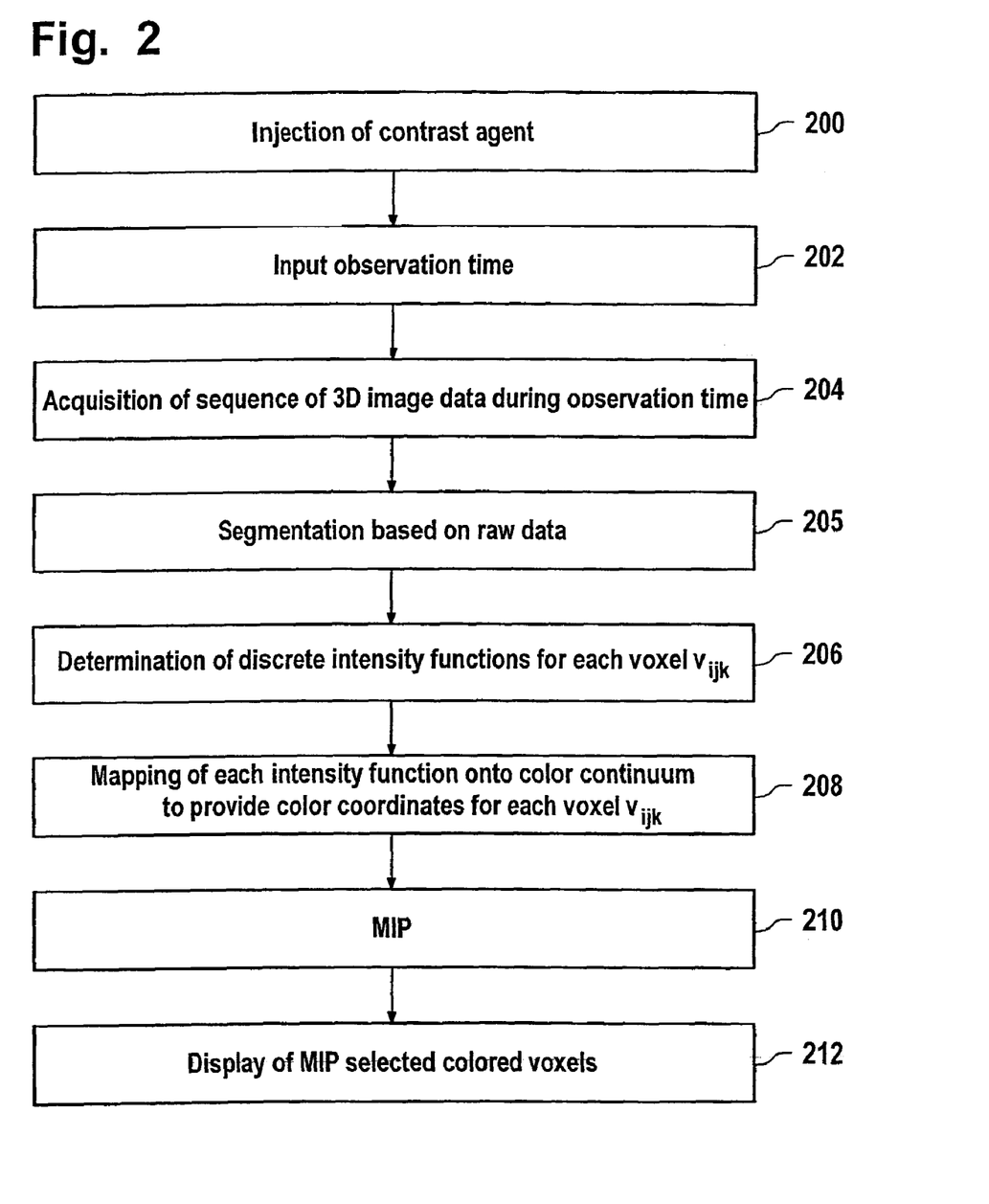
FIG. 2 is illustrative of a flow chart for performing an embodiment of a method of the invention.

FIG. 2 shows a corresponding flow chart. In step 200 contrast administration is started. In step 202 the required observation time is inputted.

In step 204 a sequence of three dimensional image data sets $D_1, D_2, D_3, \ldots D_n, \ldots D_M$ is acquired during the observation time. For each voxel within the three dimensional grid of the image data sets a discrete intensity function is determined. Such an intensity function is also referred to as contrast agent enhancement curve.

In step 205 optionally a segmentation is performed. The purpose of the segmentation can, e.g. be to improve the signal to noise ratio by filtering out regions which are not of interest or to restrict the visualization to a certain compartment only. In particular, it is advantageous to filter out such voxels which only contain air but no body tissue. This can be done by comparing the raw data of the contrast agent enhancement curve against a threshold value. If the contrast agent enhancement curve is below the threshold value a segmentation flag=0 is set for the corresponding voxel. All voxels having a segmentation flag=0 are ignored for the subsequent processing and are also not considered for the volume rendering technique (cf. step 210).

The discrete intensity functions are determined in step 206. In step 208 each of the intensity functions is mapped into a color continuum to provide color coordinates C for each of the voxels $v_{ijk}$. In step 210 a volume rendering technique is employed for visualising the resulting colored three dimensional data grid of colored voxels. Preferably a modified MIP-type technique is used for selection of voxels from the three dimensional grid. If the color encoding of the voxels $v_{ijk}$ is performed in the RGB color system it is preferred to convert the RGB color coordinates to the HSV color coordinate system. In the HSV color system the V (value) coordinate serves as a selection criterion instead of greyscale intensity. The voxel having a maximum V coordinate value on a projection line is selected for the two dimensional projection. For display of the two dimensional projection it is preferred to convert the HSV color coordinates of the selected voxel back to the RGB color space. The conversion of RGB to HSV and HSV to RGB is as such known from the prior art (cf. http://www-lehre.informatik.uni-osnabrueck.de/~cg/2000/skripV9_8_HSV_Modell.html).

In step 212 the resulting two dimensional image is displayed. The two dimensional image is a projection of the three dimensional image data and contains colored voxels. This way an intuitive display of a time variant three dimensional process is provided for diagnostic purposes.

Figure 3:
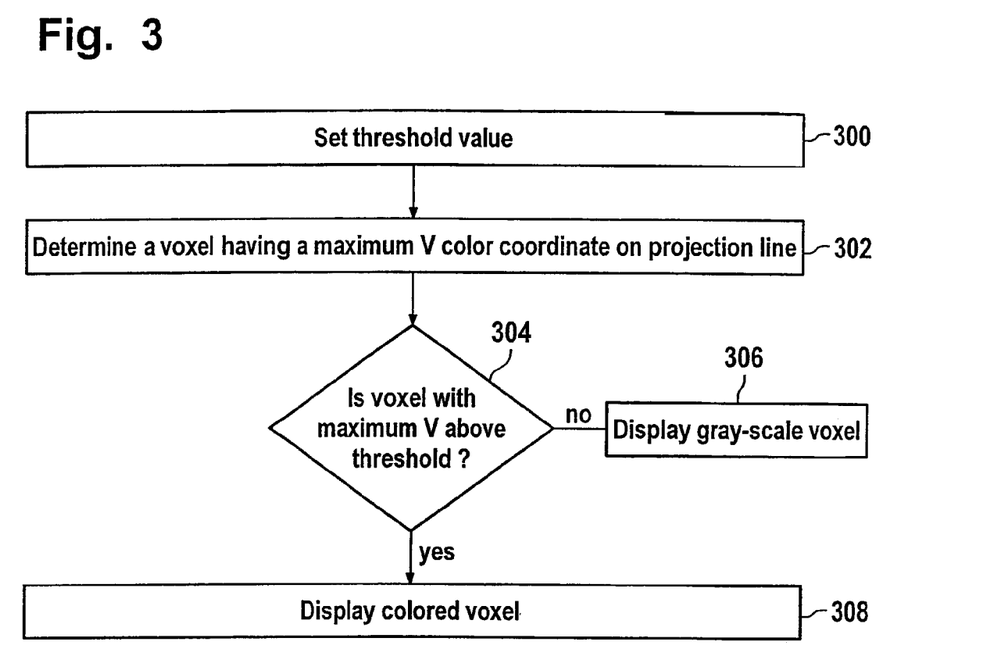
FIG. 3 is illustrative of a flow chart of a further preferred embodiment of the invention.

FIG. 3 shows a preferred embodiment of the method of FIG. 2 regarding the performance of the modified MIP (cf. step 210 of FIG. 2). In step 300, a threshold value for a voxel V color coordinate value intensity is inputted. In step 302, a MIP or a local MIP is performed by determining a voxel on a projection line having the absolute maximum V color coordinate value on the projection line or a first local maximum V color coordinate value, respectively. The "intensity" used corresponds to the V channel in the HSV color space. If the data volume is available in RGB color space only, a conversion into the HSV color space has to be done in a preprocessing step.

If the maximum intensity of the voxel determined in step 302 is above the threshold value inputted in step 300 it is decided in step 304 to go to step 308 in order to display the color of the selected voxel. In the opposite case, only the grey-scale value of the selected voxel is displayed in step 306.

Steps 302 to 308 are performed with respect to all projection lines of interest in order to generate a two dimensional projection of the three dimensional colored images. By means of the thresholding operation noise is eliminated from the image. Only those regions containing meaningful color-coded information are displayed in color while preserving the contour of the surrounding morphology in grey-scale.

Figure 4:
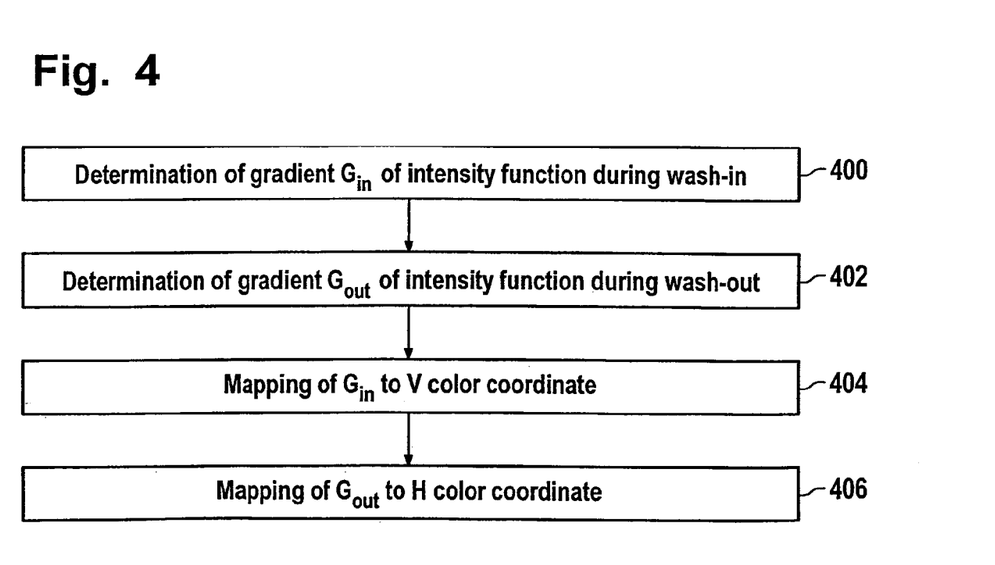
FIG. 4 is illustrative of a flow chart related to tumour diagnostics.

FIG. 4 illustrates an example of an application of the present invention for the purposes of tumour diagnostic. In step 400 the gradients $G_{in}$ of the intensity functions during wash-in of a contrast agent are determined. Likewise the gradients $G_{out}$ of the intensity functions during the wash-out of the contrast agent are determined in step 402. The gradients $G_{in}$ are mapped to a first color coordinate of a color coordinate system and the gradients $G_{out}$ are mapped to a second coordinate of the color coordinate system. This is done in steps 404 and 406, respectively.

It is preferred to use the HSV (hue, saturation and value) color coordinate system for this application. The HSV color coordinate system is also referred to HSB or HLS.

Hue defines the color itself. The values for the hue axis run from 0° to 360° beginning and ending with red and running through green, blue and all intermediary colors like greenish-blue, orange, purple, etc. This is similar to Munsell's system of hue, value and chroma.

Figure 5:
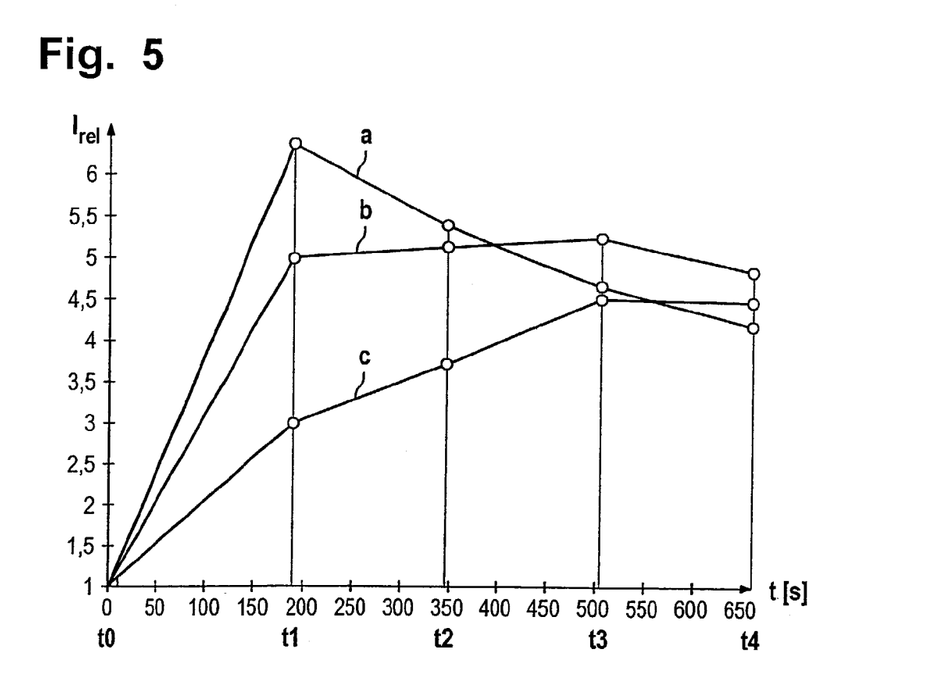
FIG. 5 is an example of intensity functions obtained for tumour diagnostic.

FIG. 5 illustrates an example dedicated to tumour diagnosisc. FIG. 5 shows a diagram of relative intensity functions $I_{rel}$ over time $t_o$ i.e. typical enhancement curves for the assessment of tumour and brain perfusion. At time to a contrast agent is injected. Intensity function a shows the contrast agent enhancement curve for a voxel $v_a$ of a three dimensional image data grid of a mammogram. Intensity functions b and c show the contrast agent enhancement curves of other voxels $v_b$ and $v_c$ of the three dimensional grid.

After administration of the contrast agent at or before time $t_o$ a sequence of four three dimensional image data acquisitions is performed at times $t_1$, $t_2$, $t_3$, $t_4$ which provides the measurement points as indicated in the diagram of FIG. 5. These measurement points form the basis for the determination of the intensity functions a, b and c.

The time interval between $t_o$ and $t_1$ is the wash-in time interval for the contrast agent; in the time interval from $t_1$ to $t_4$ the contrast agent is washed-out. The slope of the intensity curves a, b and c in the wash-in time interval between $t_o$ and $t_1$ provides the respective gradients $G_{in}$. The gradients $G_{in}$ are mapped onto the V color coordinates in accordance with the following equation:

$$V = \frac{1}{S_1^{max}} \frac{1}{I(t_0)} \cdot G_{in}, \text{ if } I(t_1) > I(t_o); V = 0 \text{ otherwise,} \quad (1)$$

where $$G_{in} = \frac{I(t_1) - I(t_0)}{t_1 - t_0}$$

and $S_1^{max}$=0.5 min$^{-1}$ and $I_{rel}$=1.

In this example, a maximum slope $S_1^{max}$ of 0.5 min$^{-1}$ is assumed without restriction of generality. The gradient $G_{in}$ is lower bounded to zero.

By evaluating this formula the V coordinate values are provided for the voxels $v_a$, $v_b$ and $v_c$.

If more measurement points are available within the wash-in time period it is preferred to use a mean gradient $\overline{G_{in}}$ which can e.g. be calculated by means of a linear regression. In this case, the above equation 1 becomes:

$$V = \frac{1}{S_1^{max}} \cdot \frac{\overline{G_{in}}}{I(t_a)} \text{ if } \overline{G_{in}} > 0; 0 \text{ otherwise,} \quad (2)$$

where $\overline{G_{in}}$ is a mean gradient within the wash-in interval.

With this approach the signal to noise ratio can be improved.

For the determination of the H color coordinate a maximum slope within the wash-out time interval is assumed, for example, $S_2^{max}$=0.2 min$^{-1}$. Hence, the interval of $[-S_2^{max}, +S_2^{max}]$ needs to be mapped onto the H coordinate. This can be done by means of the following:

$$H = 120 + 240 \cdot \frac{1}{S_2^{max}} \frac{1}{I(t_1)} \cdot G_{out} \quad (3)$$

where $$G_{out} = \frac{I(t_4) - I(t_1)}{t_4 - t_1}$$

This mapping formula is chosen such that the range of H is limited to [0, 240] in order to exclude an ambiguity of the color coding.

In order to increase the signal to noise ratio, again a mean gradient can be used:

$$H = 120 + 240 \cdot \frac{1}{S_2^{max}} \frac{\overline{G_{out}}}{I(t_c)}$$

where $G_{out}$ is a mean gradient within the wash-out interval.

In the HSV color coordinate system, the color coordinate S (saturation) indicates the degree to which the hue differs from a neutral grey. The values run from 0 (no color saturation), to 100% (the fullest saturation of a given hue at a given percentage of illumination).

In the example considered here, the color coordinate S=100% can be chosen for all voxels. If medium gradients have been calculated by means of a linear regression for the wash-in and wash-out time intervals, the statistical variance of the determined gradients can be coded into the color coordinate S.

Enhancement curves, which show a large early enhancement followed by rapid wash-out, i.e. a significant decrease of signal intensity at later timepoints are especially suspicious. Intensity function a is such a suspicious curve. Less suspicious curves (intensity functions b and c), are those curves showing a plateau at later time, or those which continue to enhance. This is typically observed in benign tumours in the breast. The invention enables to color encode this diagnostic information contained in the intensity functions.

Figure 6:
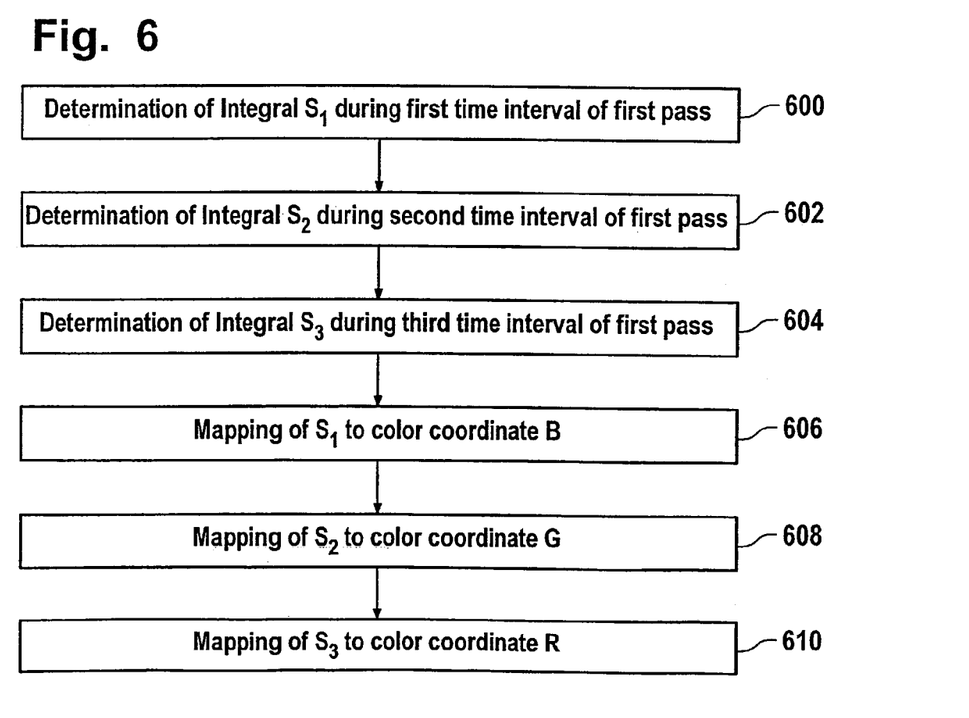
FIG. 6 is illustrative of a flow chart relating to stroke diagnostics.

FIG. 6 illustrates another application example for stroke diagnosis. Again intensity curves for the voxels are acquired by a sequence of three dimensional data image acquisition steps. For stroke diagnosis the data acquisition interval of interest is the first pass of the contrast agent. This time interval is sub-divided into three time intervals having about equal length. For a given intensity curve of a voxel an integral S1 under the intensity function during the first time interval of the first pass is calculated in step 600. Likewise integrals S2 and S3 of the consecutive second and third time intervals of the first pass are calculated in steps 602 and 604.

The integral values S1, S2 and S3 are then mapped to corresponding coordinates of a color coordinate system in steps 606, 608 and 610, respectively.

It is preferred to use the RGB color coordinate system in this instance. Alternatively the CMY or any other color coordinate system can be utilised.

By performing steps 600 to 610 for all voxels a color value is assigned to each voxel. This data forms the basis for applying a three dimensional rendering technique such as MIP.

Figure 7:
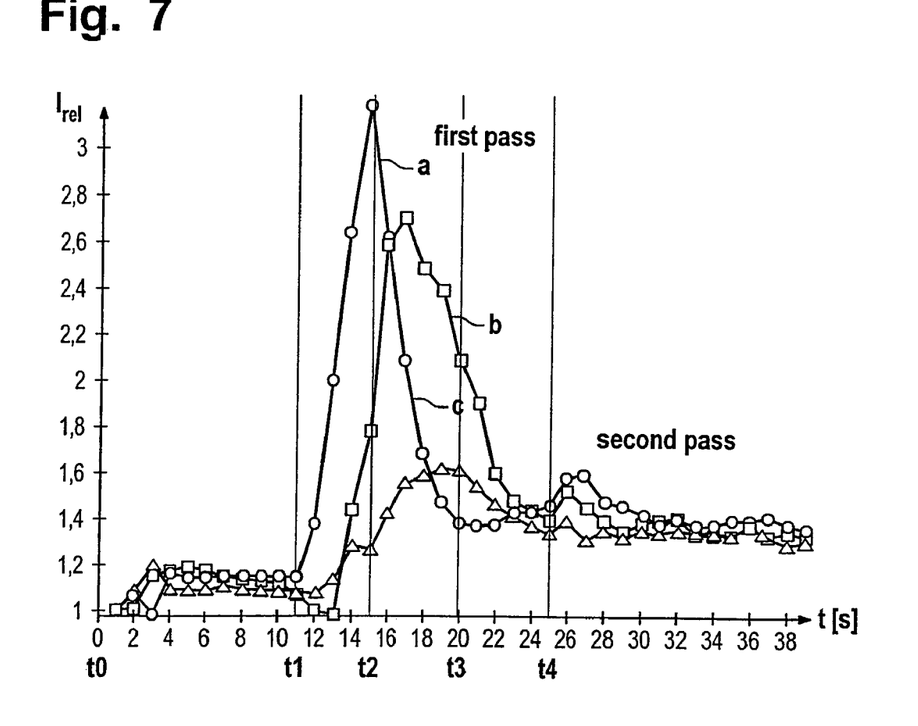
FIG. 7 is illustrative of intensity curves obtained for stroke diagnosis.

FIG. 7 shows an application example of the method of FIG. 6 for stroke diagnosis. In contrast to tumour vessels, microvessels in normal brain tissue do not leak contrast agents as a result of the blood brain barrier. Consequently, there is no enhancement in the extra-cellular volume over a longer timeperiod. Instead, there is the "first-pass" of the contrast agent through the vessel bed. About 10 seconds after the first-pass, there is a broadened second-pass after one circulation through the body.

Diagnostically relevant is the volume of blood available in each voxel as measured by the integral of the enhancement curve and the mean transit time of the blood as measured by the first moment of the curve.

The diagram of FIG. 7 shows the relative intensity $I_{rel}$ over time t. The time interval of interest for the stroke diagnosis is the time interval between $t_1$ and $t_4$ of the first pass of the contrast agent in one circulation through the body. FIG. 7 shows corresponding intensity functions a, b and c which have been acquired for three different voxels va, vb and vc within a region of the patient's body.

Curve a shows normal brain perfusion whereas b and c show decreased and delayed perfusion around an infarction. The intensity function a of the normal brain perfusion is used to determine the first, second and third time intervals. The first time interval is between the start of the first pass at time $t_1$ and the absolute maximum of the intensity function a at time $t_2$. The second interval is between the time $t_2$ until the intensity function reaches a minimum at time $t_3$. The third interval is between $t_3$ and the end of the first pass at $t_4$.

The mapping of the integrals of the intensity functions a, b and c within the respective time intervals onto the RGB-color coordinates is performed as follows:

$$B = c \cdot \int_{t_1}^{t_2}(I_{rel}(t) - I_{base})dt, \quad G = c \cdot \int_{t_2}^{t_3}(I_{rel}(t) - I_{base})dt,$$

$$R = c \cdot \int_{t_3}^{t_4}(I_{rel}(t) - I_{base})dt$$

The constant c is chosen without restriction of generality such that all RGB-color coordinate values are within the range of 0 to 1.

The measurement of blood perfusion is of interest in a variety of medical disciplines, e.g. perfusion of the brain for stoke diagnosis, the assessment of vitality of different types and stages of tumours, the detection and diagnosis of ischemia and infarction of the heart, and perfusion measurement of the extremities.

The two above described examples of FIGS. 5 and 7 cover both situations, i.e. short-term distribution as well as long term diffusion. The physical process of contrast agent enhancement in a tumour can be described by the diffusion of the macromolecular tracer particles from inside the blood vessels into the extracellular space outside and vice versa before it becomes excreted in the kidneys. The permeability of the vessel walls and the extracellular volume fraction determine the amplitude and the shape of the contrast agent enhancement curve.

Figure 8:
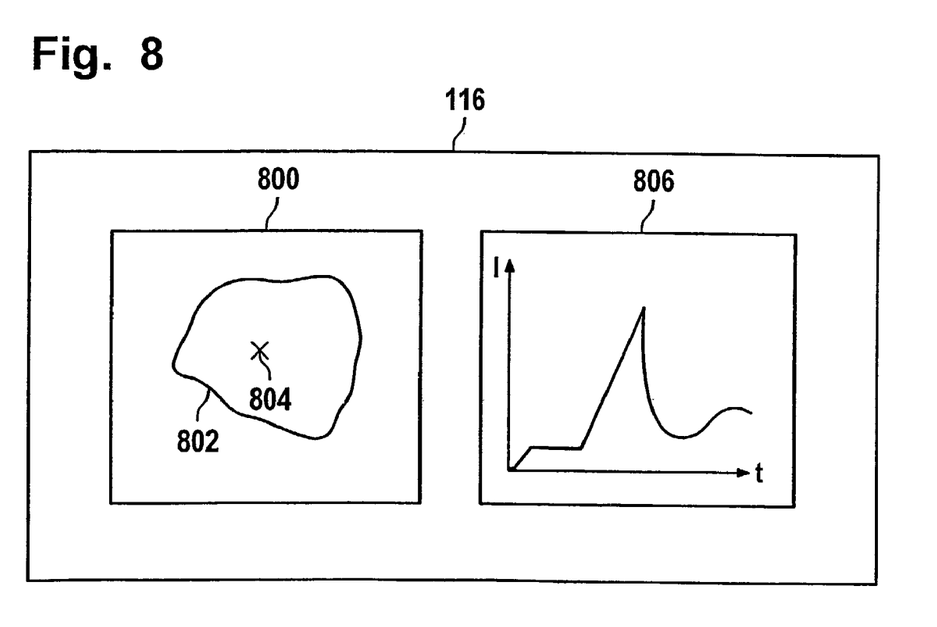
FIG. 8 is illustrative of a user interface.

FIG. 8 is illustrative of a user interface. FIG. 8 shows display unit 116 (cf. FIG. 1). Display unit 116 shows a window 800 in which a two-dimensional projection 802 of a three dimensional color-coded grid of voxels is shown. For an operator it may be of interest to access the original intensity information. For this purpose, the operator, for example a radiologist, selects one of the voxels of the projection 802, such as voxel 804, which is displayed as a pixel in the projection 802. The selection of the voxel 804 can be performed by clicking on the respective location on projection 802. The intensity function which has been determined for the selected voxel 804 (cf. module 108 of FIG. 1) is then displayed in window 806. This way the operator is enabled to consider the color encoded projection for diagnostic purposes and still access the original intensity-information.

| List of Reference Numerals | |
| --- | --- |
| 100 | apparatus |
| 102 | image data processing system |
| 104 | memory |

-continued

| List of Reference Numerals | |
|---|---|
| 106 | interface |
| 108 | module |
| 110 | module |
| 112 | 3D graphics module |
| 114 | frame buffer |
| 116 | display unit |
| 800 | window |
| 802 | projection |
| 804 | voxel |
| 806 | window |

What is claimed is:

1. A method for coloring and displaying voxels, the method comprising the steps of:
providing an intensity function for each one of the voxels,
mapping each one of the intensity functions to at least first and second color coordinates of a color continuum to provide a color for each one of the voxels,
selecting voxels to be displayed using a modified maximum intensity projection technique, where at least one color coordinate of the color continuum is used instead of voxel intensity as a selection criterion, and
on a user-readable medium, displaying at least a subset of the selected voxels with the provided color for each voxel of the subset.

2. The method of claim 1, further comprising acquiring a sequence of three dimensional medical images containing intensity data for the voxels at discrete points of time in order to provide the intensity functions.

3. The method of claim 1, further comprising the steps of:
determination of first gradients of the intensity functions during a wash-in time interval of a contrast agent,
determination of second gradients of the intensity functions during a wash-out time interval of the contrast agent,
mapping of the first gradients onto first color coordinates of the color continuum, and
mapping of the second gradients onto second color coordinates of the color continuum.

4. The method of claim 1, further comprising:
determination of first integrals of the intensity functions during a first time interval of a first pass of a contrast agent,
determination of second integrals of the intensity functions during a consecutive second time interval of the first pass,
determination of third integrals of the intensity functions during a consecutive third time interval of the first pass,
mapping of the first integrals onto first color coordinates of the color continuum,
mapping of the second integrals onto second color coordinates of the color continuum, and
mapping of the third integrals onto third color coordinates of the color continuum.

5. The method of claim 1, further comprising displaying of selected voxels having intensity values below a predefined threshold in grey-scale.

6. A non-transitory digital storage medium containing a computer program for causing a computer to perform the steps of:
providing an intensity function for each one of the voxels,
mapping each one of the intensity functions to at least first and second color coordinates of a color continuum to provide a color for each one of the voxels,
selecting voxels to be displayed using a modified maximum intensity projection technique, where at least one color coordinate of the color continuum is used instead of voxel intensity as a selection criteria, and
on a computer display unit, displaying at least a subset of the selected voxels, with the provided color for each voxel of the subset.

7. An image data processing system for computer-assisted voxel coloration and display comprising:
means for providing an intensity function for each one of a plurality of voxels,
means for mapping each one of the intensity functions to at least first and second color coordinates of a color continuum to provide a color for each one of the plurality of voxels,
means for selecting voxels to be displayed using a modified maximum intensity projection technique, where at least one color coordinate of the color continuum is used instead of voxel intensity as a selection criteria, and
means for displaying at least a subset of the selected voxels with the provided color for each voxel of the subset.

8. A medical imaging system comprising:
an image data acquisition apparatus, and
an image processing system having:
means for providing an intensity function for each one of a plurality of voxels,
means for mapping each one of the intensity functions to at least first and second color coordinates of a color continuum to provide a color for each one of the plurality of voxels,
means for selecting voxels to be displayed using a modified maximum intensity projection technique, where at least one color coordinate of the color continuum is used instead of intensity as a selection criteria, and
means for displaying at least a subset of the selected voxels with the provided color for each voxel of the subset.

9. A method for coloring and displaying voxels, the method comprising the steps of:
providing an intensity function for each one of the voxels,
mapping each one of the intensity functions to at least first and second color coordinates of a color continuum to provide a color for each one of the voxels,
selecting voxels to be displayed using a modified maximum intensity projection technique, where at least one color coordinate of the color continuum is used instead of intensity as a selection criterion,
on a user-readable medium, displaying at least a subset of the selected voxels with the provided color for each voxel of the subset, and
displaying selected voxels having intensity values below a predefined threshold in grey-scale.

* * * * *